219-121 SR

3/17/87 OR 4,650,953

United States Patent [19]

Eger et al.

[11] Patent Number: 4,650,953

[45] Date of Patent: Mar. 17, 1987

[54] PLASMA TORCH

[75] Inventors: Wolfgang Eger; Gerhard Scheiblhofer, both of Linz, Austria

[73] Assignee: Voest-Alpine Aktiengesellschaft, Linz, Austria

[21] Appl. No.: 785,285

[22] Filed: Oct. 7, 1985

[30] Foreign Application Priority Data

Oct. 11, 1984 [AT] Austria ................................ 3232/84

[51] Int. Cl.[4] ................................................ B23K 9/00

[52] U.S. Cl. ....................... 219/121 PQ; 219/121 PP; 219/121 PM; 219/75

[58] Field of Search .................... 219/74, 75, 121 PM, 219/121 PP, 121 PO, 121 PR, 76.16, 121 PN; 313/231.31, 231.41, 231.51

[56] References Cited

U.S. PATENT DOCUMENTS

| | | | |
|---|---|---|---|
| 2,967,926 | 1/1961 | Edstrom | 219/121 PR |
| 3,830,428 | 8/1974 | Dyos | 219/121 PR |
| 4,521,666 | 6/1985 | Severance, Jr. et al. | 219/121 PP |
| 4,558,201 | 12/1985 | Hatch | 219/121 PR |

FOREIGN PATENT DOCUMENTS

| | | | |
|---|---|---|---|
| 1954851 | 12/1973 | Fed. Rep. of Germany . | |
| 3241476 | 5/1984 | Fed. Rep. of Germany | 219/121 PQ |

*Primary Examiner*—M. H. Paschall
*Attorney, Agent, or Firm*—Kurt Kelman

[57] ABSTRACT

A plasma torch comprises an electrode secured to a liquid-cooled electrode holder and formed with a flow passage communicating with a central outlet for delivering an ionizable gas and a nozzle body which surrounds the electrode and serves to conduct gas along the outside surface of the electrode. To permit an increase of the torch power, the central outlet communicating with the flow passage constitutes a diffuser. The outlet opening of the diffuser is axially spaced from the nozzle body.

5 Claims, 1 Drawing Figure

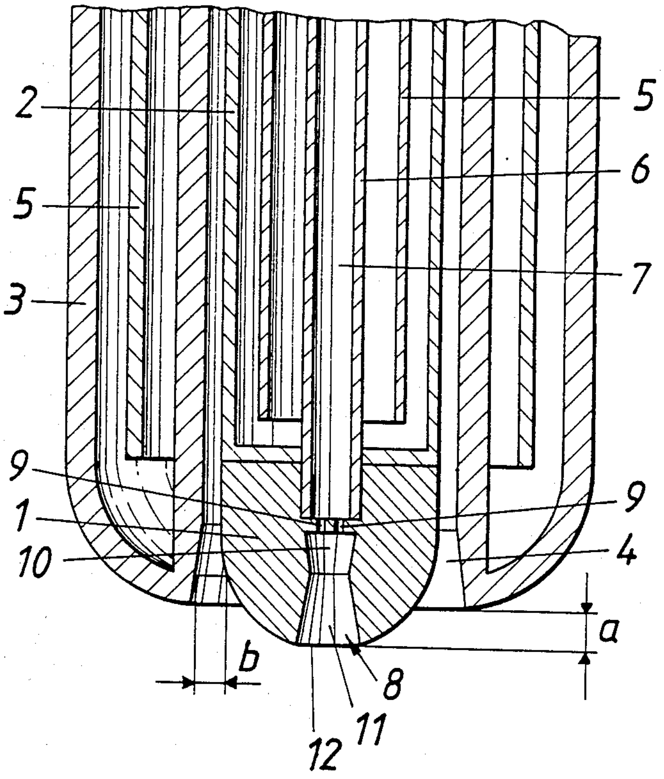
2
5
3
9
1
10
5
6
7
9
4
a
b
8
11
12

PLASMA TORCH

BACKGROUND OF THE INVENTION

1. Field of the Invention

This invention relates to a plasma torch comprising an electrode secured to a liquid-cooled electrode holder and formed with a flow passage communicating with a central outlet for delivering an ionizable gas and a nozzle body which surrounds said electrode and serves to conduct gas along the outside surface of the electrode.

2. Description of the Prior Art

Compared to a plasma torch having a solid electrode, a plasma burner having an electrode which is formed with a centrally disposed flow passage for supplying a part of the ionizable plasma flame affords the advantage that the centrally supplied plasma gas effects an additional cooling. It is known from DE-A-31 41 476 that long, stable electric arcs can be produced by such plasma torches if an annular nozzle orifice is provided between the frustoconical electrode and a coaxial nozzle body, which surrounds the electrode, and said orifice directs the plasma gas into the electric arc at an acute angle thereto. That orifice is so shaped that the gas flows out in such a direction that the stability of the arc is substantially improved. On the other hand, a disadvantage resides in that the special shape of the nozzle orifice causes the electrode to be axially set back relative to the nozzle body so that the nozzle body is subjected to a high thermal load, which causes the nozzle body to be rapidly consumed. As a result, the geometry of the nozzle orifice will be altered and the flow at the desired angle may not be maintained for a prolonged time. Besides, the electrodes have only a restricted current-carrying capacity.

From DE-B-1 954 851 it is known that the electric power and the efficiency of a plasma beam generator can be increased in that the velocity of the plasma jet leaving the nozzle is increased. For this purpose the outlet nozzle of the arc discharge chamber of the plasma jet generator consists of a double nozzle and the inner outlet orifice and the annular outer outlet orifice constitute respective Laval nozzle passages. A disadvantage of that known plasma jet generator resides in that the design of the outlet orifice precludes an increase of the torch power because the plasma jet which has been formed in the arc discharge chamber is present adjacent to the outlet nozzle.

SUMMARY OF THE INVENTION

For this reason it is an object of the invention to avoid said disadvantages and so to improve a plasma torch of the kind described first hereinbefore that the torch power and the useful life of the electrode can be increased in a torch having a relatively simple structure.

The object set forth is accomplished in accordance with the invention in that the central outlet communicating with the flow passage constitutes a diffuser having an outlet opening which is axially spaced from the nozzle body.

Because a diffuser is provided which is formed by the central outlet of an electrode rather than by an outlet nozzle of an arc discharge chamber, the plasma gas which is supplied is caused to expand and, in combination with a surface that is larger than the surface of a cylindrical bore, an additional cooling of the electrode is effected. The diffuser ensures also that the plasma gas will have a desirable flow pattern so that the plasma jet formed immediately behind the nozzle will be stabilized. Because the electric arc has a higher stability, the bath will be agitated adjacent to the electric arc and that agitation will tear open the slag layer floating on the molten bath so that a direct heat transfer to the molten bath is permitted. Owing to the provision of the diffuser, the electrode surface and, as a result, the emitting surface, is increased so that the load per unit of area of the electrode is increased and the torch can be operated with a higher power.

To ensure that the torch will have an adequate useful life in spite of its higher power, the outlet opening of the diffuser is axially spaced from the nozzle body. Because the plasma jet can be substantially stabilized by the diffuser, there is hardly a risk that the nozzle body, which is set back from the electrode and is cooled in the usual manner, may be subjected to a destructively high thermal loading. As a result, the nozzle geometry will be preserved for prolonged times, particularly if the radial clearance between the electrode and the nozzle body increases toward the outlet opening of the diffuser. That increasing clearance will have a desirable influence not only on the thermal loading of the nozzle body but also on the flow of gas through the nozzle because the diffuser will promote a laminar flow.

In order to provide particularly desirable conditions for the flow of the plasma gas to the electric arc, the diffuser may constitute a part of a Laval nozzle passage.

Because the emitting zone of the electrode may extend beyond the diffuser or Laval nozzle passage toward the flow passage, the diffuser or Laval nozzle passage communicates with the flow passage preferably through at least two openings. For a given flow area, the boundary surfaces of two or more openings are correspondingly larger than the boundary surface of a single opening so that the emitting surface of the electrode is appreciably increased by said measure and the thermal load per unit of area of the electrode is decreased. If the thermal load per unit of area should not exceed a predetermined upper limit, the power of the torch can be increased accordingly.

BRIEF DESCRIPTION OF THE DRAWING

The drawing is a simplified axial sectional view showing a plasma torch embodying the invention.

DETAILED DESCRIPTION OF THE PREFERRED EMBODIMENT

The invention is illustrated by way of example on the drawing.

The illustrated plasma torch comprises an electrode 1, which is secured in conventional manner to a water-cooled electrode holder 2. The electrode 1 and the electrode holder 2 are carried and surrounded by a water-cooled nozzle body 3, which defines with the electrode 1 an annular gap 4 for a flow of a purging gas or plasma gas. To ensure a circulation of a liquid coolant, the nozzle body 3 and the electrode holder 2 are provided each with a tubular partition 5. An ionizable plasma gas is centrally supplied by a pipe 6, which extends tightly through the electrode holder 2 and is fitted in a mating recess formed in the electrode 1. That pipe 6 defines a centrally disposed flow passage 7. The electrode 1 is formed with a centrally disposed Laval nozzle passage 8, which communicates with the flow passage 7 through at least two openings 9. As a result, the ionizable gas flows from the flow passage 7 through the openings 9 first into the tapering portion 10 of the Laval nozzle passage 8 and subsequently leaves the electrode 1 through that portion of the Laval nozzle passage which consists of a diffuser 11. As is clearly apparent from the drawing, the outlet opening 12 of the diffuser 11 is axially spaced from the nozzle body 3 by a distance a. Particularly good conditions in the nozzle will be obtained if the distance a is at least five times the diameter of the electrode. Because the electrode 1 has a hemispherical outside surface adjacent to its protruding end and the inside peripheral surface of the nozzle body 3 is conical, the radial clearance b between the electrode 1 and the nozzle body 3 increases toward the outlet end 12 of the diffuser 11. Owing to the action of the diffuser, the gas conducted through the annular gap 4 can flow without a disturbing turbulence. Besides, the increase of the clearance b toward the outlet of the annular gap 4 prevents also a striking of a secondary electric arc between the electrode and the nozzle body 3 particularly because the diffuser 11 formed by the protruding electrode 1 ensures an effective stabilization of the electric arc.

The provision of the flow passage having an outlet consisting of a Laval nozzle passage ensures not only particularly favorable conditions of flow for the centrally supplied plasma gas but results also in an increase of the emitting surface of the electrode 1 so that the thermal load per unit of area of the electrode will be reduced. This effect is promoted by the fact that the boundary surface is increased by the openings 9 so that the current load may be much higher than with conventional electrodes. Because the electrode is cooled by the supplied plasma gas, the thermal load will remain within permissible limits as the cooling of the electrode is improved by the provision of a relatively large emitting surface and by the expansion of the gas in the diffuser 11. Because turbulent flow is substantially avoided, the plasma flow can agitate the bath at the other end of the electric arc so that the slag layer floating on the molten bath is torn open and heat can directly be transferred to the molten material.

We claim:

1. In plasma torch comprising a liquid-coolable electrode holder, an electrode secured to said electrode holder and having an outside peripheral surface, a centrally disposed outlet and a centrally disposed gas flow passage communicating with said outlet, and a nozzle body surrounding said outside peripheral surface and defining an annular gas flow passage therewith, wherein the improvement comprises that said centrally disposed outlet constitutes diffuser for the gas flow, the diffuser having an outlet opening axially projecting from said nozzle body.

2. The improvement set forth in claim 1, wherein a Laval nozzle passage defines said diffuser.

3. The improvement set forth in claim 2, wherein said Laval nozzle passage communicates with said centrally disposed flow passage through at least two openings formed in said electrode.

4. The improvement set forth in claim 1, wherein said diffuser communicates with said centrally disposed flow passage through at least two openings formed in said electrode.

5. The improvement set forth in claim 1, wherein said electrode and said nozzle body define between them a radial clearance which increases toward the outlet opening of said diffuser.

* * * * *